US012699799B2

(12) United States Patent
Soni et al.

(10) Patent No.: US 12,699,799 B2
(45) Date of Patent: Aug. 4, 2026

(54) CONTROLLED ACCESS PROVISION FOR DATA EXPLORATION IN MANAGED COMPUTE DATASETS

(71) Applicant: Microsoft Technology Licensing, LLC, Redmond, WA (US)

(72) Inventors: Saurabh Soni, Hyderabad (IN); Rahulinder Singh, Noida (IN); Jyotsana Singh, New Delhi (IN); Sudhir Angara, Hyderabad (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 66 days.

(21) Appl. No.: 18/658,961

(22) Filed: May 8, 2024

(65) Prior Publication Data

US 2025/0348612 A1 Nov. 13, 2025

(51) Int. Cl.
*G06F 21/62* (2013.01)

(52) U.S. Cl.
CPC .. *G06F 21/6227* (2013.01); *G06F 2221/2113* (2013.01); *G06F 2221/2125* (2013.01); *G06F 2221/2137* (2013.01); *G06F 2221/2141* (2013.01)

(58) Field of Classification Search
CPC ......... G06F 21/6227; G06F 2221/2113; G06F 2221/2125; G06F 2221/2137; G06F 2221/2141
See application file for complete search history.

(56) References Cited

U.S. PATENT DOCUMENTS

| | | | |
|---|---|---|---|
| 2018/0101600 A1* | 4/2018 | Ushanov | ........... G06F 16/24578 |
| 2018/0268161 A1* | 9/2018 | Mityagin | ................ G06F 21/10 |
| 2023/0350959 A1* | 11/2023 | Timm | ................ G06F 16/9535 |
| 2025/0238544 A1* | 7/2025 | Jiang | ................ G06F 16/24564 |

* cited by examiner

*Primary Examiner* — Mohammad W Reza
(74) *Attorney, Agent, or Firm* — Barta Jones, PLLC

(57) ABSTRACT

A computerized method provides secure and controlled access provisions for data exploration in managed compute datasets. A workspace on a compute cluster is created for a user with permissions to the workspace. The compute cluster that includes a code analyzer is provisioned within a cloud computing infrastructure. The code analyzer is configured to: receive a data query from a task executing on the compute cluster; identify a query operation included in the data query; compare the query operation to a list of prohibited query operations for the workspace to which the user has the permissions; and terminate the data query without execution when the query operation is in the list of prohibited query operations for the workspace to which the user has the permissions.

20 Claims, 8 Drawing Sheets

Figure 4:
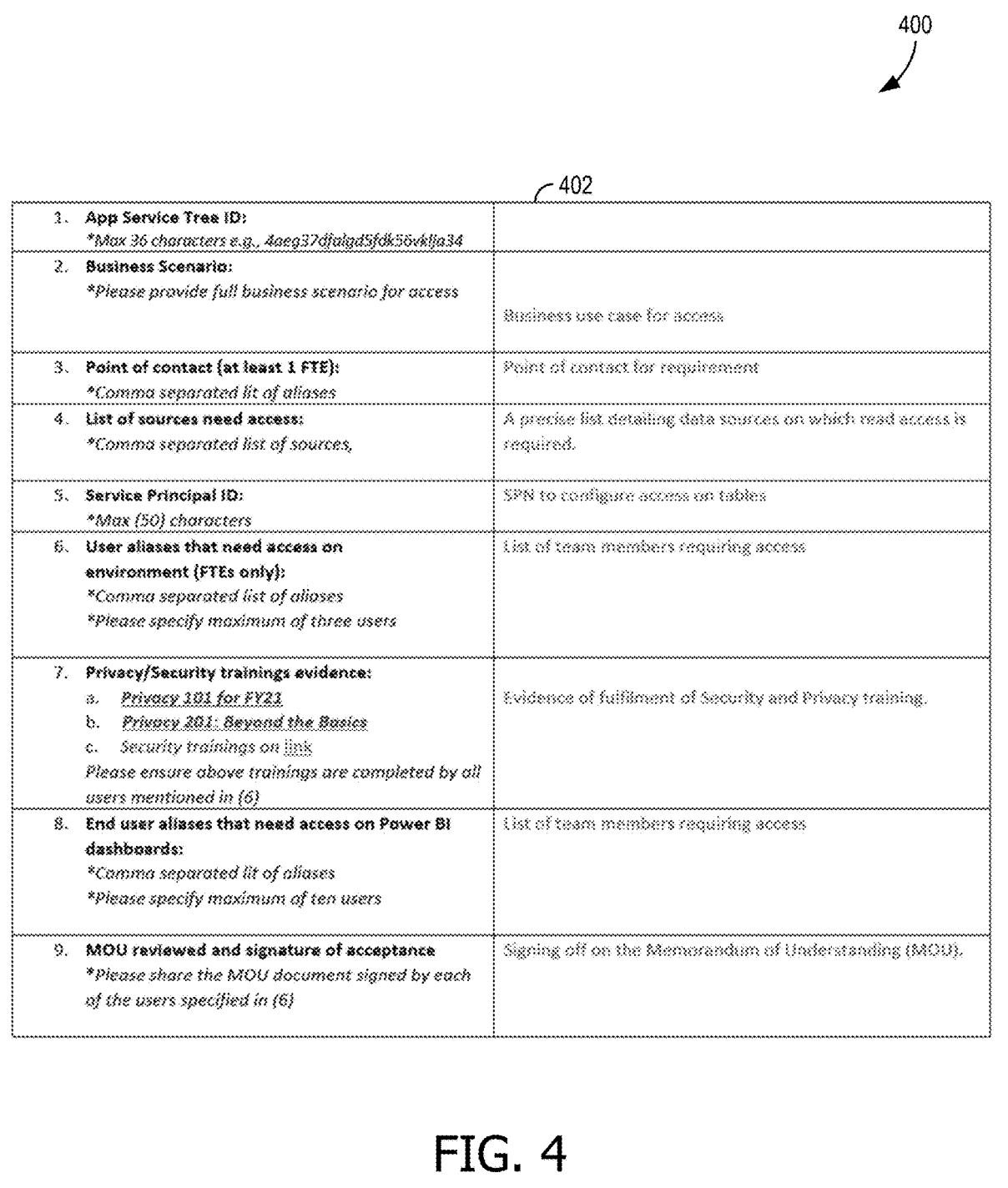

400

402

| 1. App Service Tree ID: *Max 36 characters e.g., 4aeg37dfalgd5fdk56vklja34 | |
|---|---|
| 2. Business Scenario: *Please provide full business scenario for access | Business use case for access |
| 3. Point of contact (at least 1 FTE): *Comma separated list of aliases | Point of contact for requirement |
| 4. List of sources need access: *Comma separated list of sources, | A precise list detailing data sources on which read access is required. |
| 5. Service Principal ID: *Max (50) characters | SPN to configure access on tables |
| 6. User aliases that need access on environment (FTEs only): *Comma separated list of aliases *Please specify maximum of three users | List of team members requiring access |
| 7. Privacy/Security trainings evidence:   a. *Privacy 101 for FY21*   b. *Privacy 201: Beyond the Basics*   c. *Security trainings on link* Please ensure above trainings are completed by all users mentioned in (6) | Evidence of fulfillment of Security and Privacy training. |
| 8. End user aliases that need access on Power BI dashboards: *Comma separated list of aliases *Please specify maximum of ten users | List of team members requiring access |
| 9. MOU reviewed and signature of acceptance *Please share the MOU document signed by each of the users specified in (6) | Signing off on the Memorandum of Understanding (MOU). |

First Contact Form

Requesting Team App Service Tree Id *

Example: 63d74749-9314-4e61-b757-1f59fa0173a6

Dev Service Principal Id *

Example: 74712d44-363c-4865-b142-388ea6c3caa6

Prod Service Principal Id *

Example: 74712d44-363c-4865-b142-388ea6c3caa6

Pub App Short Name(s) (Source Name) *

Select an Option

Source Definition Catalogue

App Business Type/Request Type *

Select an Option

**Note : Power Apps/Process/Tooling requests pertain to specific processes, while Reporting Requests focus on obtaining insights.

App Business Purpose *

Please provide full business purpose of the App

700
702
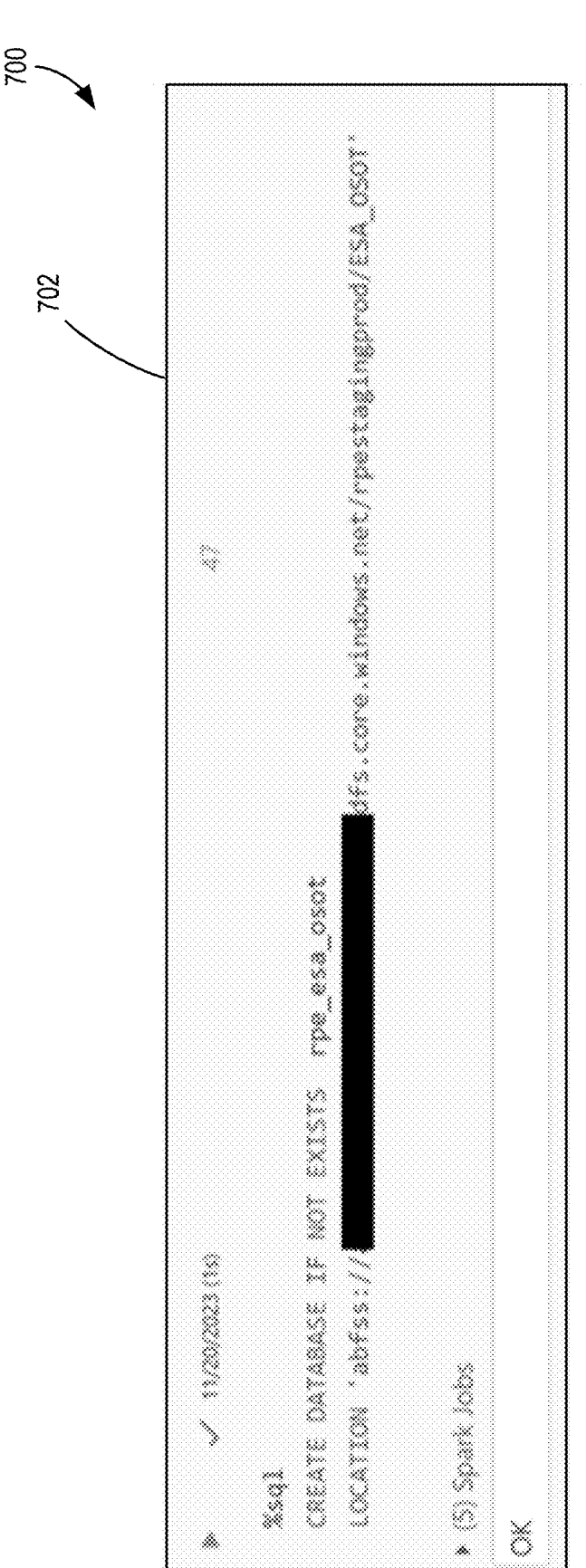
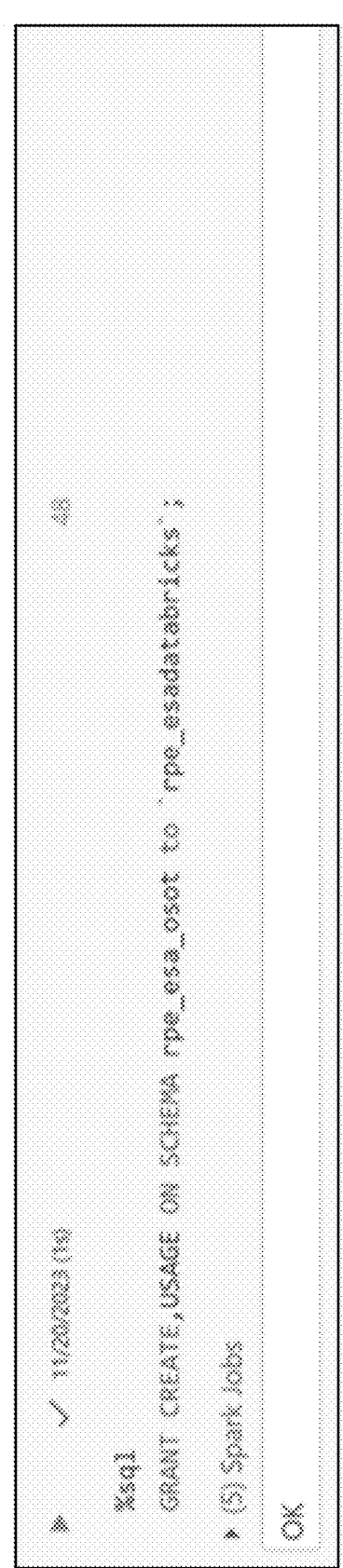
FIG. 7

800

CONTROLLED ACCESS PROVISION FOR DATA EXPLORATION IN MANAGED COMPUTE DATASETS

BACKGROUND

Business teams conducting "Proof of Concepts" (PoCs) often access diverse and sensitive data sources for exploration to reveal trends and integrate insights into strategic frameworks. Such PoCs typically involve a team of data scientists, business analysts, information technology (IT) professionals, or other relevant stakeholders that collaborate to explore data sources and derive insights. The sensitivity of certain data, as well as compliance considerations, can expose an enterprise to vulnerabilities. For example, conventional PoCs may bypass standard security protocols and controls that are typically enforced in a production environment, which can lead to sensitive data being copied or moved to environments that lack adequate security measures, increasing the risk of data leakage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for providing secure and controlled access provisions for data exploration in managed compute datasets is described. A workspace on a compute cluster is created for a user with permissions to the workspace. The compute cluster that includes a code analyzer is provisioned within a cloud computing infrastructure. The code analyzer is configured to: receive a data query from a task executing on the compute cluster; identify a query operation included in the data query; compare the query operation to a list of prohibited query operations for the workspace to which the user has the permissions; and terminate the data query without execution when the query operation is in the list of prohibited query operations for the workspace to which the user has the permissions.

BRIEF DESCRIPTION OF THE DRAWINGS

The disclosed examples are described in detail below with reference to the accompanying drawing figures listed below:

FIG. 4 is a screenshot of an example user interface that is used to submit a request to onboard a new team onto the EA system.

FIG. 5 is a screenshot of an example user interface that is used to submit a request to provision a new EA workspace for an analytics team;

FIG. 7 is a screenshot of a dashboard illustrating monitoring the write functionality commands users execute.

Corresponding reference characters indicate corresponding parts throughout the drawings. Any of the drawings may be combined into a single example or embodiment.

DETAILED DESCRIPTION

Figure 1:
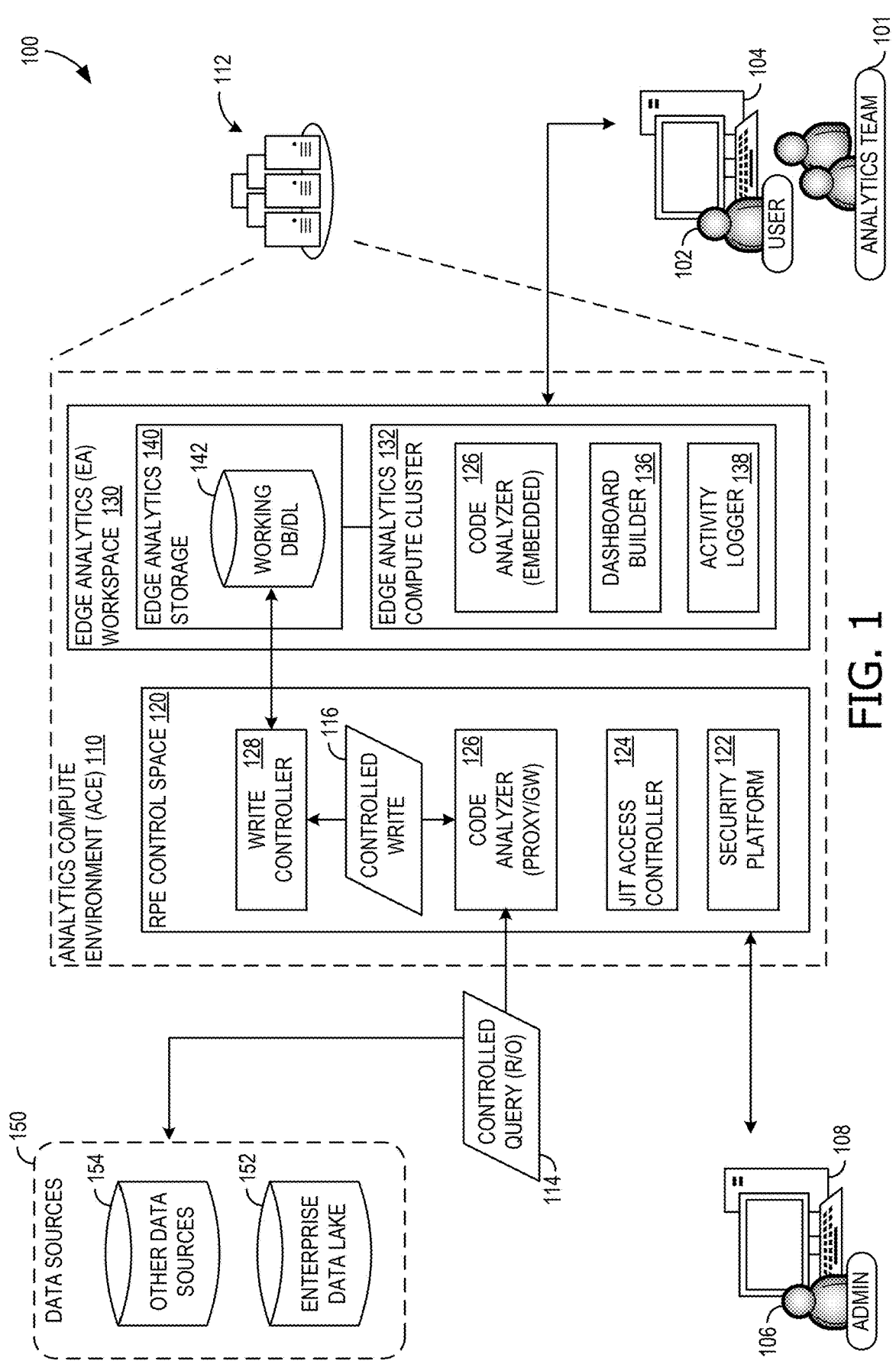
FIG. 1 is a diagram of an edge analytics (EA) system that is configured to provide a protected environment for data analytics and exploration.

Aspects of the disclosure provide systems and methods for providing secure and controlled access provisions for data exploration in managed compute datasets. A workspace on a compute cluster is created for a user with permissions to the workspace. The compute cluster that includes a code analyzer is provisioned within a cloud computing infrastructure. The code analyzer is configured to: receive a data query from a task executing on the compute cluster; identify a query operation included in the data query; compare the query operation to a list of prohibited query operations for the workspace to which the user has the permissions; and terminate the data query without execution when the query operation is in the list of prohibited query operations for the workspace to which the user has the permissions. In this way, even though the user may have permissions to the workspace, some data query operations that are in a list of prohibited query operations for the workspace are prevented from execution thereby advantageously implementing secure and controlled access provisions for the workspace.

To address potential data security vulnerabilities that can occur during data analytics such as PoCs, the present disclosure provides a solution that ensures protected and regulated access to data during these activities. In examples, an edge analytics (EA) framework is provided that offers just-in-time (JIT) access to business users (e.g., analytics teams) in a cloud computing platform. The EA framework provides enhanced security by centrally managing user authentication and access in order to eliminate complexities associated with multiple login credentials (e.g., one login credential for read access and another login credential for write access) and to provide a seamless, controlled user experience across the platform. Users can securely connect, query, read, and analyze managed compute data within the cloud computing platform (e.g., databases, data lakes, or the like, of the business entity), as well as configure read access to third-party data sources, with meticulous logging to ensure traceability and compliance with security and data governance policies. Analytics teams can also utilize a dedicated workspace for building compliant dashboards and reports based on the explored data.

In examples, the EA framework prioritizes safety and compliance features, granting users access solely to essential data for their tasks, thereby minimizing unauthorized exposure risk. The EA framework employs controlled write and flexible read permissions to safeguard sensitive data, providing strict adherence to industry-leading data protection standards and Transparency in Research Platform (TRIP) guidelines to ensure robust security. The framework controls data access to protect both what data is read as well as where data is written, thereby establishing a protected workspace in which escape vectors for data are minimized. Various compliance features, including audit logs and data lineage tracking, create a comprehensive record for easy internal and external audit fulfillment. The EA framework thus enables business entities to confidently explore and analyze data in a secure, compliant environment, bolstering critical business operations and decision-making processes.

In examples, the EA framework provides a protected "analytics workspace" that includes both compute resources (an "analytics compute cluster") as well as a "working database" that facilitates the data exploration just-in-time access for a team of users ("analytics team"). The EA framework also provides a rapid prototyping environment (RPE) that manages the analytics workspace(s) of the various teams, as well as various control functionalities. The RPE includes a "JIT access controller" that is configured to control access to the analytics workspace on a periodic basis, enabling access for only select members of the analytics team and withdrawing that access on a periodic basis (e.g., every 8 hours). The RPE also provides a code analyzer for the analytics workspace that gatekeeps and manages aspects of data access, blocking specific, restricted commands such as "save" commands that allow users to write/save protected data to unapproved locations. The RPE additionally provides a write controller that controls various write operations to ensure that protected data never leaves the EA framework space for any given team.

In some examples, the EA framework provides an activity logger that is configured to log user activity (e.g., what data fields of which data sources are being accessed during data queries), allowing administrators and teams to track and monitor conduct for security integrity and compliance. The EA framework also ensures that team members are only given access after they have completed privacy and/or security training and have attested to data usage memoranda of understanding (MOUs). A dashboard builder is also provided that allows team members to create prototype dashboards that allow similar analytics to be performed again in the future (e.g., as underlying data changes or evolves).

The various examples are described in detail with reference to the accompanying drawings. Wherever preferable, the same reference number is used throughout the drawings to refer to the same or like parts. References made throughout this disclosure relating to specific examples and implementations are provided solely for illustrative purposes but, unless indicated to the contrary, are not meant to limit all examples.

FIG. 1 is a diagram of an edge analytics (EA) system 100 that is configured to provide a protected environment for data analytics and exploration. The EA system 100 provides an analytics compute environment (ACE) 110 in which users 102 (e.g., data scientists) of an analytics team 101 perform data exploration tasks using data from data sources (e.g., "external data sources 150") including an enterprise data lake 152 or other data sources 154. The ACE 110 includes an edge analytics workspace 130 that is accessed by the analytics team 110 to perform their analytics tasks, as well as a rapid prototyping environment (RPE) control space 120 that is configured to manage certain operational aspects of that EA workspace 130. The ACE 110 is configured with several features that enhance data security, including providing just-in-time access for the users 102 of the analytics team 101 (e.g., providing timed access to the EA workspace 130 and automatically expiring that access) and limiting what operations can be performed on particular data (e.g., limiting which data the analytics team 101 can read, where data can be written).

In examples, the ACE 110 is provided in a virtualized cloud computing environment 112 in which various compute resources are provisioned to create an EA workspace 130 specific to each analytics team 101 (e.g., where each team 101 includes their own set of users 102, and perhaps their own permission structure for data access to the data sources 150). Each EA workspace 130 includes an EA compute cluster 132 and EA storage 140. The EA compute cluster 132 includes compute resources (not separately shown) that are provisioned from the cloud computing environment 112 (e.g., virtual machines, driver nodes, worker nodes, or the like). The compute resources of the cluster 132 are thus configured to execute the various tasks (not shown) programmed by the analytics team 101, as well as several integrated security features provided by the ACE 110, as described herein. The EA storage 140 is storage space provided by the cloud computing environment 112 that acts as a "working" storage area for the EA workspace 130. This EA storage 140 facilitates the data analytics operations performed on the EA compute cluster 132, being used, for example, to store raw data that is read from the data sources 150 (e.g., structured, semi-structured, or unstructured data), or to store processed data generated by the analytics performed by the EA compute cluster 132 (e.g., interim results of data analytics operations).

During operation, the analytics team 101 inputs a request form (not shown in FIG. 1) to request the creation of an EA workspace 130. An administrative user ("admin") 106 interacts via a computing device 108 with a security platform 122 in the RPE control space 120 to configure the EA workspace 130 on behalf of the analytics team 101 (e.g., in response to the request). In some examples, the admin 106 configures the EA compute cluster 132, defining what computing resources are provisioned for the EA compute cluster 132 (e.g., virtual machines, processors, volatile memory, operating systems, and associated storage space). In some examples, one of the users 102 of the team 101 via a computing device 104 defines the compute parameters for the EA workspace 130 and compute cluster 132. Further, the admin 106 also configures user access for the EA workspace 130 through the security platform 122. More specifically, in examples, the request identifies which users 102 and/or which team 101 are requesting access to the EA workspace 130, as well as what data the team 101 is requesting to be allowed for this workspace 130 (e.g., from data sources 150). In some examples, the users 102 of the team 101 certify that they have completed privacy and/or security training and/or attest to data usage memoranda of understanding (MoUs) before access to the requested data is allowed in the EA environment 110.

In examples, the RPE control space 120 provides a just-in-time (JIT) access controller 124 that is configured to manage user access to the EA workspace 130 (e.g., providing just-in-time access for the EA workspace 130). In examples, just-in-time access involves granting rights to particular users 102, starting at a particular time or after a particular event (e.g., at the beginning of a work day, upon administrative enablement of access), and lasting for a limited period (e.g., for a predetermined duration of time, until a particular task is complete), in contrast to persistent user access (e.g., until after an employee changes roles, a change in employment status, manual deactivation, automatic deactivation after a certain period of inactivity), where such persistent user access could pose additional security risks. In other examples, the JIT access is implemented via enforcement of a list of prohibited query operations for users of the workspace (e.g., whether JIT-based user access or persistent access). In such examples, the list of prohibited query operations is enforced during a predetermined time period for the identified users, and when outside that predetermined time period, all query operations for those users are excluded (e.g., prohibited) by default. The access control functionality provided by the JIT access controller 124 includes, for example, enabling account access for users 102 of the team 101 (e.g., after verification that any particular user 102 has completed the privacy/security training and/or MoUs). The JIT access controller 124 is also configured to automatically disable access for the users 102 of the team 101 after a predetermined time period (e.g., after 8 hours from establishment of account access for any given user 102, for a particular work day or work week). As such, users 102 of the team 101 request subsequent access after their allotted time expires, thereby providing a limited time window for access to the protected data being accessed by (and potentially stored in) the EA workspace 130.

In addition to user access control, the ACE 110 also enforces certain data access controls over the EA workspace 130. More specifically, in examples, the ACE 110 provides a code analyzer 126 that is configured to analyze queries initiated by any of the tasks executed by the EA compute cluster 132 and to enforce restrictions on such queries. In some examples, the code analyzer 126 is installed within the EA compute cluster 132 (shown in FIG. 1 as an "embedded" code analyzer 126, e.g., executing within the EA compute cluster 132). In other examples, the code analyzer 126 executes within the RPE control space 120 (shown in FIG. 1 as a "proxy/gateway" code analyzer 126). In both architectures, the code analyzer 126 functions as a query preprocessor, inspecting any and all data queries generated by any and all tasks executing within the EA workspace 130 and allowing or rejecting queries based on a preconfigured set of data restrictions (e.g., unrestricted commands). For example, when a query is submitted, it goes through various phases such as parsing, logical planning, optimization, and physical planning before execution. Since the logical plan generated for a query is language-independent, the code analyzer 126 does not impose any limitations on the programming language used.

In some examples, the EA compute cluster 132 executes an analytics engine (not separately shown), such as Apache Spark. This analytics engine provides an interface for programming within the EA compute cluster 132 that facilitates large-scale data processing. The analytics engine provides a comprehensive, general-purpose cluster computing framework that supports various applications, including interactive queries, machine learning, data analytics, and data integration. In some examples, the analytics engine provides framework libraries such as Spark SQL, Spark Streaming, MLlib (e.g., for machine learning), and the like. In the Spark framework, the SparkSessionExtensions feature enables the customization of specific stages within Spark SQL's execution flow. Examples leverage this capability in the code analyzer to extend the SparkSessionExtension, enabling interaction with Spark SQL's processing pipeline during the logical planning phase. Here, the code analyzer 126 intercepts the logical plans of queries, permitting execution only if the command isn't among the restricted commands. The execution lifecycle of a query is:

Parsing→logical plan→Spark Extension (Code Analyser)
→Analyze and optimization→physical planning→Execute The code analyzer 126 acts more like a filter or inspector, not a gateway or proxy. The user 102 submits a query through their chosen method (e.g., Databricks notebook cell). Spark translates the user query into a series of logical plans representing the data transformations. The code analyzer 126 analyzes the logical plan and checks for disallowed operations like SaveIntoDataSourceCommand. If no disallowed commands are found, the code analyzer 126 allows the logical plan to proceed and transfers control back to the user task. The code analyzer 126 doesn't directly submit the query itself. Instead, it essentially "greenlights" the analyzed logical plan. Spark SQL continues its processing pipeline, performing optimizations and generating a physical plan for execution. Control returns to the user task, which interacts with Spark through its APIs to trigger the actual execution on the cluster. In this way, the code analyzer 126 acts as a checkpoint during query processing. The code analyzer 126 analyzes the user's intent (reflected in the logical plan) and allows the query to proceed if it adheres to the defined rules. The user task remains responsible for initiating the final execution on the cluster.

The analytics engine also provides a software framework, such as Apache Hadoop, that is configured to use many computers (e.g., nodes of compute resources assigned to the EA compute cluster 132 from the cloud computing environment 112) to perform distributed processing of big data analytics, machine learning, and the like.

The EA compute cluster 132 thus positions the code analyzer 126 between tasks data access operations configured/programmed by the users 102 of the EA workspace 130 and the execution of those data access operations. Some data access commands provided by the EA compute cluster 132 may allow users 102 to perform operations on any data source that the user 102 otherwise has access to (e.g., based on their own user credentials). This may allow the user 102 to write data out of the ACE 110, representing conduct that is prohibited by the ACE 110. Accordingly, to limit such operations (e.g., regardless of whether the user 102 is otherwise permissioned to perform such operations), when a task is executed within the EA compute cluster 132, all data queries or other such data manipulation operations are initially redirected to the code analyzer 126. The code analyzer 126 generates a logical query plan and/or a physical query plan for that query. Such query plan(s) identify what operations are included in the query, such as selections (e.g., WHERE clauses), projections (e.g., SELECT statements), joins, aggregations (e.g., GROUP BY clauses), and the like. In examples, the code analyzer 126 compares these "planned query operations" of the query with a set of restricted operations that are prohibited for the EA workspace 130. In examples, prohibited operations include operations that are configured to write or otherwise manipulate data (e.g., "SAVE", "SAVE INTO", "INSERT INTO" type commands), or change session variables (e.g., "SET" type commands). For those queries that include one or more prohibited operations, the code analyzer 126 rejects the query and returns an error code or error message (e.g., "SAVE is disabled"). Otherwise, the query is passed along to the destination data source (e.g., to data sources 150, as controlled query 114, or to working DB 142).

In examples, only read operations are allowed from data sources 150 outside of the EA workspace 130. Likewise, read, write, update, and delete-type operations are allowed within the EA workspace 130, but write operations attempted to data sources external to the EA workspace 130 are prohibited by the EA workspace 130. As such, the code analyzer 126 protects the data read by the EA workspace 130 by controlling data writes via a write controller 128. The write controller 128 manages any and all operations that are performed on the working DB 142. The write controller 128 is configured to restrict copying, publishing, moving, deleting, or updating sensitive data, which helps maintain data integrity, authenticity, and security. The write controller 128 inspects and restricts operations with the working DB 142 such as to limit any write operations from being performed to destinations outside of the boundaries of the EA workspace 130 (illustrated here as controlled write 116). Like the read operations managed by the code analyzer 126, the controlled write 116 is only allowed by the write controller 128 when the destination of the controlled write 116 is within the EA workspace 130.

The controlled write 116 and code analyzer 126 are two layers of security for data. The controlled write 116 ensures data security by restricting data movement and manipulation. The code analyzer 126 enforces specific rules on what type of data manipulation is allowed by analyzing the queries before execution to enforce specific data manipulation rule. The code analyzer 126 stops unauthorized actions (blocks commands like SAVE) even if the path seems valid.

Examples of the disclosure ensure data security through controlled write access for each team by:

1. Table Access Control (TAC) Clusters: Separate clusters are configured with TAC enabled. This restricts each team's access to only the tables their corresponding user group has permissions for.
2. Team-Specific User Groups: User groups are created for each team, granting them controlled access to specific tables within the TAC clusters.
3. Granular File Access with Service Principal Names (SPNs): SPNs are created for each team. These SPNs grant write access only to designated folders within Azure Data Lake Storage (ADLS), ensuring teams can only write data to their assigned locations.

In some examples, the EA workspace 130 also provides an activity logger 138. The activity logger 138 is configured to generate log entries for each read and/or write operation attempted by the EA compute cluster 132. Such log entries may include, for example, the user 102, team 101, or task attempting the operation, a timestamp recording the date and time of the attempt, the source and/or destination attempted, the operation attempted, the result of the attempt, and the like. These log entries may thus be reviewed by the team 101 or admin 106 to ensure data usage compliance, identify additional restrictions that may be implemented, machine learning of the code analyzer 126, and for forensic investigation in the case of data leaks.

In some examples, the EA workspace 130 also provides a dashboard builder 136. The dashboard builder 136 allows the user 102 to construct a dashboard (e.g., a set of one or more programmed data examination tasks) for particular data examinations of interest to the team 101. Such dashboards can be used later to re-execute a particular task (e.g., to recompute/reanalyze particular data), thus creating a refreshed analytical view of such data.

In examples, the data sources 150 includes an enterprise data lake 152 that may be accessed by the ACE 110. The data lake 152 is designed to store a vast amount of raw, unstructured, and semi-structured data at scale. As such, the data lake 152 does not rely upon a predefined schema before storing the data (e.g., schema-on-read), meaning that data can be stored in its native format without the need to transform the data, and the structure of the data can be defined when the data is read. In some examples, the other data sources 154 can include any number of databases (e.g., designed to store, retrieve, update, and manage data in a structured format, optimized for create/read/update/delete operations and transaction processing), data warehouses (e.g., specialized for analytical processing, to aggregate, summarize, and analyze large volumes of data, storing data in a structured format, often using a schema-on-write approach where the data schema is defined before data is written into the warehouse), or other data lakes. As such, controlled queries 114 may be implemented for any or all such data sources 150, all of which may be controlled by the code analyzer 126 as described herein.

While the example EA workspace 130 shows a single EA compute cluster 132 and EA storage 140 dedicated to that cluster 132, in some examples, the ACE 110 may support multiple EA compute clusters 132, each of which has an associated EA storage 140. In such examples, the code analyzer(s) 126 may be configured with different restrictions based on a particular pair of EA storage and EA compute cluster.

While the architecture of the example EA system 100 is presented in FIG. 1 in a cloud computing environment, it should be understood that other compute architectures may be provided that enable the systems and methods described herein. For example, any of the RPE control space 120, EA workspace 130, or any components thereof, such as the EA storage 140 or EA compute cluster 132, may be executed on non-virtualized computing devices (e.g., dedicated servers).

Figure 2:
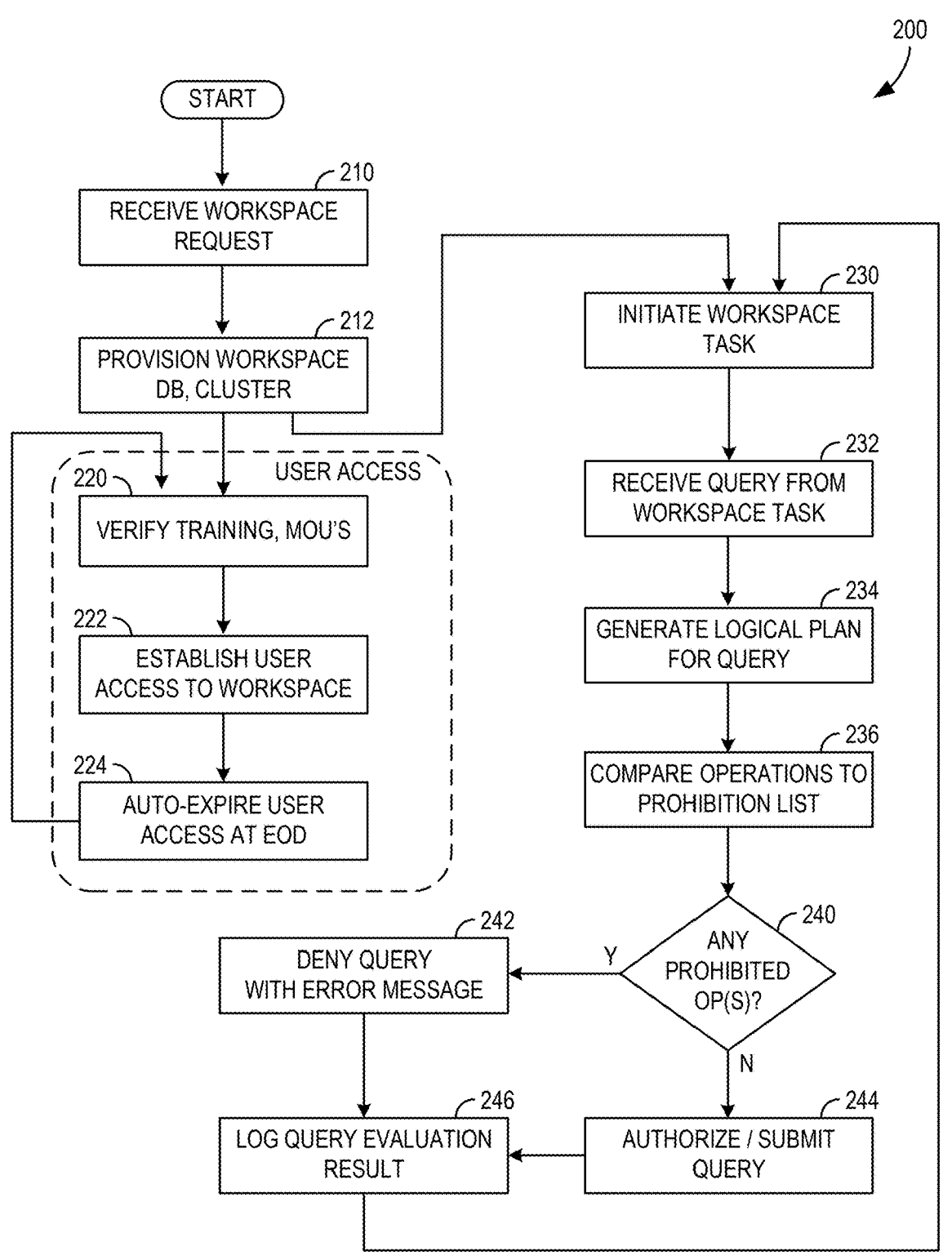
FIG. 2 is a flow chart illustrating example operations for enforcing security protections on data queries within the EA workspace of FIG. 1.

FIG. 2 is a flow chart 200 illustrating example operations for enforcing security protections on data queries within the EA workspace 130 of FIG. 1. In examples, the operations are performed by components of the ACE 110, including the JIT access controller 124, the code analyzer 126, and/or the write controller 128. At operation 210, the ACE 110 receives a workspace request to provision a new workspace for the analytics team 101. The request, in examples, identifies the type and quantity of compute and storage resources requested (e.g., for the EA compute cluster 132 and the EA storage 140), user details identifying which user(s) 102 are to be given access to the EA workspace 130 (e.g., which users 102 are a part of the analytics team 101), and which data sources 150 are intended to be accessed by the EA workspace 130. At operation 212, the ACE 110 provisions the EA compute cluster 132 and the EA storage 140 for the new EA workspace 130. In some examples, the provisioning of operation 212 may include installation of the code analyzer 126 as an embedded component of the EA compute cluster 132. In some examples, the provisioning of operation 212 also includes establishing a list of prohibited operations for the EA workspace 130 (e.g., from a predetermined list of prohibited operations, from operations selected by the administrator 106, or both).

At operations 220-224, the JIT access controller 124 manages user access to the new EA workspace 130. More specifically, at operation 220, the JIT access controller 124 identifies one or more users 102 requesting access for the EA workspace 130 and verifies that those users have certified any predetermined security and/or privacy training implicated for the EA workspace 130 (e.g., based on the data being accessed, based on the workspace request, or the like). In some examples, operation 220 includes verifying that the user(s) have completed one or more MoU's associated with access to the workspace 130. At operation 222, upon successful verification, the JIT access controller 124 establishes user access for the identified user(s) to the EA workspace 130. Such access is granted for a predetermined time period, such as 8 hours, one business day, one calendar week, or the like. The JIT access controller 124 monitors the access time and terminates access when that time expires. At operation 224, when the access time for any particular user 102 has expired, the JIT access controller 124 automatically expires (e.g., terminates, revokes, cancels, or the like) access for the user 102 to the EA workspace 130 (e.g., at the end of the day (EOD)). Subsequently, user access may again be granted to users 102 (e.g., by the admin 106, upon another request, or the like) for another predetermined time period, thus returning to operation 220 for re-verification.

During the operational lifecycle of the EA workspace 130, users 102 of the team 101 access the workspace 130 to perform data exploration tasks. The users 102, for example, utilize programmatic interfaces provided by the workspace 130 to create data exploration tasks. Some such tasks may perform data query operations directed at data sources 150 (e.g., to read data pertinent to the task), or at the working DB 142 of the EA storage 140 (e.g., reading or writing working data generated by tasks executed in the EA workspace 130). At operations 230-240, the code analyzer 126 inspects any and all such queries prior to their submission and execution on the target data source.

More specifically, at operation 230, a workspace task is initiated within the EA workspace 130 (e.g., executed by a user 102, executed via a dashboard, automatically executed, or the like). This example workspace task includes a data query that is received by the code analyzer 126 at operation 232. The code analyzer 126 generates a logical plan for the query at operation 234, identifying which operations are included in the query. At operation 236, the code analyzer 126 compares parameters of the identified operations to the prohibited list of operations established for the EA workspace 130. These prohibited operations, in examples, include operation identifiers (e.g., syntactical names of operators within a query or programming syntax, such as SQL), types or categories of operations (e.g., read-type operations, update-type operations, write-type operations, delete-type operations), and may include target data sources (e.g., a particular data source 150 such as the enterprise data lake 152, or the working DB 142). As such, operation 236 includes comparing the identified operations to the prohibition list to identify whether the query contains any prohibited operations.

At test 240, if the query contains any prohibited operations, the code analyzer 126 denies the query and returns an error message indicating the reason for the denial at operation 242. If, at test 240, the query does not contain any prohibited operations, the code analyzer 126 authorizes the query to be performed on the targeted data source, submitting the query for processing at operation 244. In both cases, the code analyzer 126 logs the results of the query evaluation at operation 246.

Figure 3:
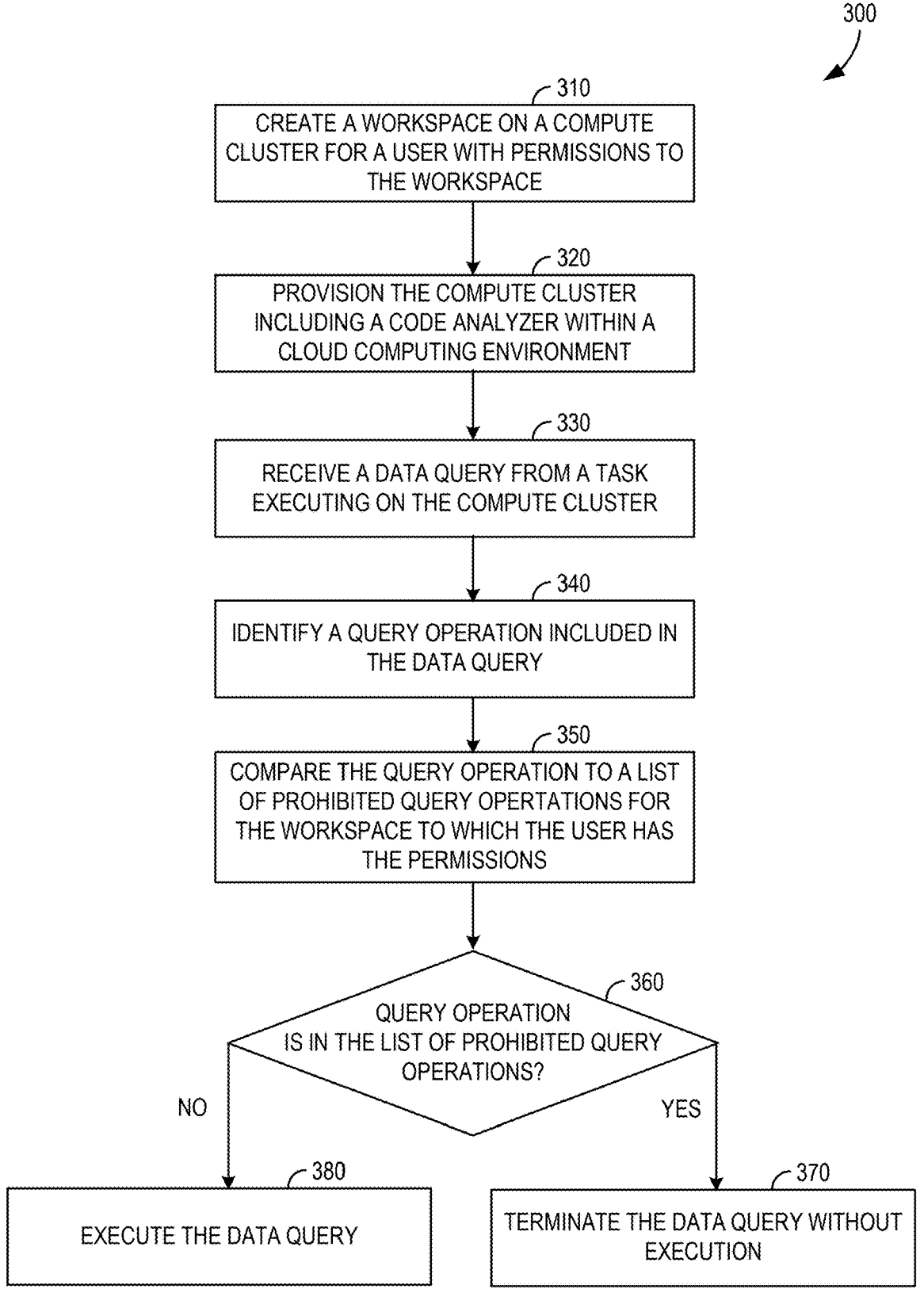
FIG. 3 is a flow chart illustrating example operations for enforcing security protections on data queries within a workspace to which a user has permissions.

FIG. 3 is a flow chart 300 illustrating example operations for enforcing security protections on data queries within a workspace to which a user has permissions. At 310, a workspace on a compute cluster is created for a user with permissions to the workspace. In some examples, the workspace is created upon receiving a request for creating the workspace on the compute cluster for the user via a user interface. The compute cluster that includes a code analyzer is provisioned within a cloud computing infrastructure at 320. The code analyzer is configured to: receive a data query from a task executing on the compute cluster at 330; identify a query operation included in the data query at 340; compare the query operation to a list of prohibited query operations for the workspace to which the user has the permissions at 350; and determine whether the query operation is in the list of prohibited query operations for the workspace to which the user has the permissions at 360. If the query operation is determined to be in the list of prohibited query operations to which the user has the permissions at 360, the data query is terminated without execution at 370. Otherwise, if the query operation is determined to be not in the list of prohibited query operations at 360, the data query is executed at 380.

In some examples, the code analyzer is configured to: compare the query operation to a list of allowed query operations for the workspace instead of comparing the query operation to a list of prohibited query operations for the workspace at 350; and determine whether the query operation is in the list of allowed query operations for the workspace instead of determining whether the query operation is in the list of prohibited query operations for the workspace at 360. In such examples, if the query operation is determined to be not in the list of allowed query operations, the data query is terminated without execution. Otherwise, if the query operation is determined to be in the list of allowed query operations, the data query is executed.

In some examples, the query operation is for a first database in the workspace, and the code analyzer is further configured to: identify another query operation included in another data query from the task; and allow the other data query operation when the other data query operation is for a second database outside the workspace. In such examples, the query operations are allowed for the second database outside the workspace without even needing to compare these query operations for the second database with the list of prohibited query operations for the workspace.

In some examples, the list of prohibited query operations for the workspace is implemented as a just-in-time (JIT) access control feature that enforces the list of prohibited query operations for the user during a predetermined time period and excludes all query operations for the user outside of that predetermined time period by default. In such examples, a list of users to be controlled via the list of prohibited query operations while operating within the workspace is received and the enforcement of operations for the list of users is granted though the JIT access control feature. This ensures JIT based access to the workspace, providing protected access to users and then that access is removed after a predetermined time period (e.g., after 8 hours).

In some examples, the list of prohibited query operations for the workspace is configured just-in-time (JIT) for a predetermined time period. In such examples, a list of users to be provided the permissions to the workspace is received and the permissions to the workspace to the list of users is granted though JIT. This ensures JIT based access to the workspace providing protected access to users and access to the users are removed after a predetermined time period (e.g., after every 8 hours).

In some examples, the code analyzer is further configured to: identify another query operation included in another data query from the task (e.g., same task); and allow the other data query operation through a just-in-time access feature that enforces the list of prohibited query operations for an external user during a predetermined time period and excludes all query operations for the external user outside of that predetermined time period by default, wherein the external user is from an entity external to the workspace. In such examples, the external users from an entity external to the workspace are also provided access to the workspace (e.g., to perform operations) which could not be done externally before (e.g., without multiple login credentials for the different operations).

In some examples, the code analyzer is further configured to: identify another query operation included in another data query from the task (e.g., same task); and allow the other data query operation through JIT. In such examples, the users from an entity external to the workspace are also provided access to the workspace (e.g., to perform operations) which could not be done externally before (e.g., without multiple login credentials for the different operations).

In some examples, the code analyzer is further configured to: receive a list of users to be provided the permissions to the workspace; and grant access to the workspace to the list of users though a just-in-time access feature that controls access to the workspace for a predetermined time period and automatically expires that granted access after the predetermined time period has elapsed.

In some examples, the data queries from the task executing on the compute cluster are logged (e.g., by the activity logger 138). The code analyzer is trained based on the logged data queries and how accurate are the actions (e.g., blocking or executing the queries) for the logged queries by the code analyzer. In some examples, the code analyzer is trained using machine learning techniques. The list of prohibited query operations for the workspace is automatically updated using the trained code analyzer.

FIG. 4 is a screenshot 400 of an example user interface 402 that is used to submit a request to onboard a new team such as team 101 onto the EA system.

FIG. 5 is a screenshot 500 of an example user interface 502 that is used to submit a request to provision a new EA workspace 130 for an analytics team 101.

Figure 6:
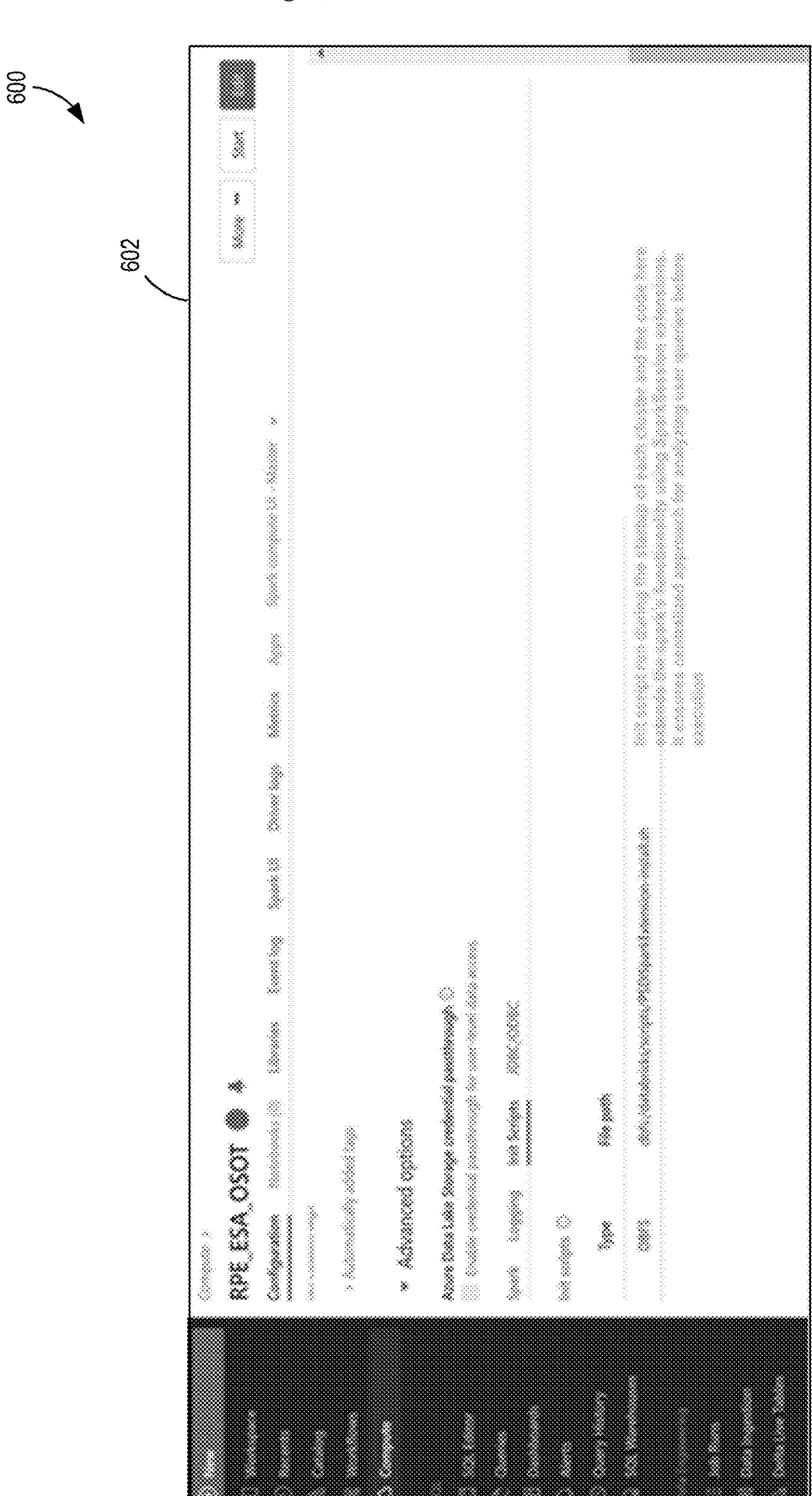
FIG. 6 is a screenshot of the code analyzer illustrating configuration of Init Scripts.

FIG. 6 is a screenshot 600 of the code analyzer 126 illustrating configuration of Init Scripts run during the startup of each cluster and the code in the Init Script extends the Spark's functionality using SparkSession extensions. The code analyzer 126 ensures centralized approach for analyzing user queries before execution.

FIG. 7 is a screenshot 700 of a dashboard illustrating monitoring the write functionality commands that users execute. If a command violates security policies, it can be added to the "analyzer block list," effectively preventing its future execution.

The EA framework eliminates the need to have multiple login credentials (e.g., one login credential for read access and another login credential for write access). Examples of the disclosure implement controlled write access to the workspace with a single login credential. For example, the controlled write is allowed only when the destination of the controlled write is within the workspace and the controlled write meets just-in-time (JIT), otherwise the controlled write is denied. In this example, the JIT may be configured with read access for a first 8 hours and controlled write access for a second 8 hours with a single login credential of a user for a particular workspace. Thus, the EA framework emerges as a comprehensive answer for organizations. It establishes a controlled environment, enabling users to work on prototypes without concerns about data access leakage or unauthorized sharing beyond the organization's boundaries. The EA framework ensures a secure space for training and testing, following the principle of data minimization for reduced security breach impact. Ultimately, secure data access contributes to business continuity, reinforcing data integrity and promoting overall organizational reliability and success.

Example Operating Environment

Figure 8:
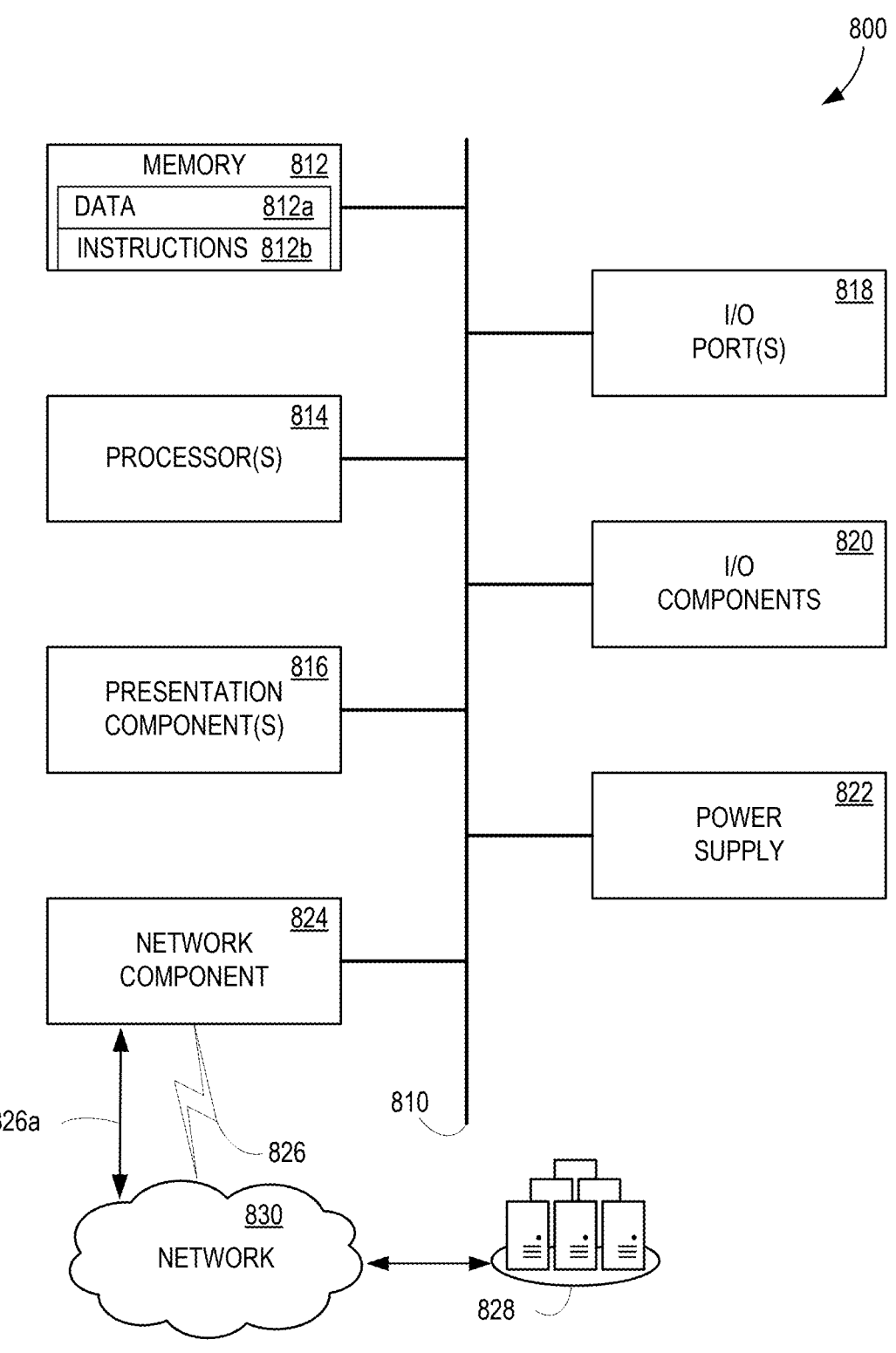
FIG. 8 is a block diagram of an example computing device (e.g., a computer storage device) for implementing aspects disclosed herein.

FIG. 8 is a block diagram of an example computing device 800 (e.g., a computer storage device) for implementing aspects disclosed herein and is designated generally as computing device 800. In some examples, one or more computing devices 800 are provided for an on-premises computing solution. In some examples, one or more computing devices 800 are provided as a cloud computing solution. In some examples, a combination of on-premises and cloud computing solutions are used. Computing device 800 is but one example of a suitable computing environment and is not intended to suggest any limitation as to the scope of use or functionality of the examples disclosed herein, whether used singly or as part of a larger set. Neither should computing device 800 be interpreted as having any dependency or requirement relating to any one or combination of components/modules illustrated.

The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 800 includes a bus 810 that directly or indirectly couples the following devices: computer storage memory 812, one or more processors 814, one or more presentation components 816, input/output (I/O) ports 818, I/O components 820, a power supply 822, and a network component 824. While computing device 800 is depicted as a seemingly single device, multiple computing devices 800 may work together and share the depicted device resources. For example, memory 812 may be distributed across multiple devices, and processor(s) 814 may be housed with different devices.

Bus 810 represents what may be one or more busses (such as an address bus, data bus, or a combination thereof). Although the various blocks of FIG. 8 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 8 and the references herein to a "computing device." Memory 812 may take the form of the computer storage media referenced below and operatively provide storage of computer-readable instructions, data structures, program modules and other data for the computing device 800. In some examples, memory 812 stores one or more of an operating system, a universal application platform, or other program modules and program data. Memory 812 is thus able to store and access data 812*a* and instructions 812*b* that are executable by processor 814 and configured to carry out the various operations disclosed herein.

In some examples, memory 812 includes computer storage media. Memory 812 may include any quantity of memory associated with or accessible by the computing device 800. Memory 812 may be internal to the computing device 800 (as shown in FIG. 8), external to the computing device 800 (not shown), or both (not shown). Additionally, or alternatively, the memory 812 may be distributed across multiple computing devices 800, for example, in a virtualized environment in which instruction processing is carried out on multiple computing devices 800. For the purposes of this disclosure, "computer storage media," "computer-storage memory," "memory," and "memory devices" are synonymous terms for the computer-storage memory 812, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the computing device 800, or by a processor external to the client computing device 800. In some examples, the processor(s) 814 are programmed to execute instructions such as those illustrated in the flow charts discussed below and depicted in the accompanying drawings. Moreover, in some examples, the processor(s) 814 represent an implementation of analog techniques to perform the operations described herein. For example, the operations may be performed by an analog client computing device 800 and/or a digital client computing device 800. Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 800, across a wired connection, or in other ways. I/O ports 818 allow computing device 800 to be logically coupled to other devices including I/O components 820, some of which may be built in. Example I/O components 820 include, for example but without limitation, a microphone, joystick, game pad, satellite dish, scanner, printer, wireless device, etc.

Computing device 800 may operate in a networked environment via the network component 824 using logical connections to one or more remote computers. In some examples, the network component 824 includes a network interface card and/or computer-executable instructions (e.g., a driver) for operating the network interface card.

Communication between the computing device 800 and other devices may occur using any protocol or mechanism over any wired or wireless connection. In some examples, network component 824 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 824 communicates over wireless communication link 826 and/or a wired communication link 826a to a remote resource 828 (e.g., a cloud resource) across network 830. Various different examples of communication links 826 and 826a include a wireless connection, a wired connection, and/or a dedicated link, and in some examples, at least a portion is routed through the internet.

Although described in connection with an example computing device 800, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

An example computing system comprises a processor; and a computer-readable medium storing instructions that are operative upon execution by the processor to: create a workspace on a compute cluster for a user, the user having permissions to the workspace; and provision the compute cluster within a cloud computing infrastructure, the compute cluster including a code analyzer, the code analyzer being configured to: receive a data query from a task executing on the compute cluster; identify a query operation included in the data query; compare the query operation to a list of prohibited query operations for the workspace to which the user has the permissions; and terminate the data query without execution when the query operation is in the list of prohibited query operations for the workspace to which the user has the permissions.

An example method comprises creating a workspace on a compute cluster for a user, the user having permissions to the workspace; and provisioning the compute cluster within a cloud computing infrastructure, the compute cluster including a code analyzer, the code analyzer being configured to: receive a data query from a task executing on the compute cluster; identify a query operation included in the data query; compare the query operation to a list of prohibited query operations for the workspace to which the user has the permissions; and terminate the data query without execution when the query operation is in the list of prohibited query operations for the workspace to which the user has the permissions.

An example computer-readable medium stores instructions that are operative upon execution by a processor to: create a workspace on a compute cluster for a user, the user having permissions to the workspace; and provision the compute cluster within a cloud computing infrastructure, the compute cluster including a code analyzer, the code analyzer being configured to: receive a data query from a task executing on the compute cluster; identify a query operation included in the data query; compare the query operation to a list of allowed query operations for the workspace to which the user has the permissions; and terminate the data query without execution when the query operation is not in the list of allowed query operations for the workspace to which the user has the permissions.

Alternatively, or in addition to the other examples described herein, examples include any combination of the following:

wherein the query operation is for a first database in the workspace, the code analyzer being further configured to: identify another query operation included in another data query from the task; and allow the other data query operation when the other data query operation is for a second database outside the workspace.

wherein the list of prohibited query operations for the workspace is configured just-in-time (JIT) for a predetermined time period.

wherein the code analyzer is further configured to: identify another query operation included in another data query from the task; and allow the other data query operation through JIT, wherein the user is from an entity external to the workspace.

wherein the instructions are further operative upon execution by the processor to: receive a list of users to be provided the permissions to the workspace; and grant the permissions to the workspace to the list of users though JIT.

wherein the instructions are further operative upon execution by the processor to: receive, via a user interface, a request for creating the workspace on the compute cluster for the user.

wherein the instructions are further operative upon execution by the processor to: log data queries from the task executing on the compute cluster; train the code analyzer based on the logged data queries; and automatically update, using the trained code analyzer, the list of prohibited query operations for the workspace.

wherein the list of prohibited query operations for the workspace is implemented as a just-in-time (JIT) access control feature that enforces the list of prohibited query operations for the user during a predetermined time period and excludes all query operations for the user outside of that predetermined time period by default.

wherein the code analyzer is further configured to: identify another query operation included in another data query from the task; and allow the other data query operation through a just-in-time access feature that enforces the list of prohibited query operations for an external user during a predetermined time period and excludes all query operations for the external user outside of that predetermined time period by default, wherein the external user is from an entity external to the workspace.

wherein the instructions are further operative upon execution by the processor to: receive a list of users to be provided the permissions to the workspace; and grant access to the workspace to the list of users though a just-in-time access feature that controls access to the workspace for a predetermined time period and automatically expires that granted access after the predetermined time period has elapsed.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computing system comprising:
a processor; and
a memory storing instructions that are operative upon execution by the processor to:
create a workspace including a compute cluster for a user, the user having permissions to the workspace; and
provision the compute cluster within a cloud computing infrastructure, the compute cluster including a code analyzer, the code analyzer being configured to:
receive a data query from a task executing on the compute cluster;
identify a query operation included in the data query;

compare the query operation to a list of prohibited query operations for the workspace to which the user has the permissions; and terminate the data query without execution when the query operation is in the list of prohibited query operations for the workspace to which the user has the permissions.

2. The computing system of claim 1, wherein the list of prohibited query operations for the workspace is implemented as a just-in-time (JIT) access control feature that enforces the list of prohibited query operations for the user during a time period and excludes all query operations for the user outside of that time period by default.

3. The computing system of claim 1, wherein the query operation is for a first database in the workspace, the code analyzer being further configured to:

identify another query operation included in another data query from the task; and allow the other data query operation when the other data query operation is for a second database outside the workspace.

4. The computing system of claim 1, wherein the code analyzer is further configured to:

identify another query operation included in another data query from the task; and allow the other data query operation through a just-in-time access feature that enforces the list of prohibited query operations for an external user during a predetermined time period and excludes all query operations for the external user outside of that predetermined time period by default, wherein the external user is from an entity external to the workspace.

5. The computing system of claim 1, wherein the instructions are further operative upon execution by the processor to:

receive a list of users to be provided the permissions to the workspace; and grant access to the workspace to the list of users though a just-in-time access feature that controls access to the workspace for a predetermined time period and automatically expires that granted access after the predetermined time period has elapsed.

6. The computing system of claim 1, wherein the instructions are further operative upon execution by the processor to:

receive, via a user interface, a request for creating the workspace on the compute cluster for the user.

7. The computing system of claim 1, wherein the instructions are further operative upon execution by the processor to:

log data queries from the task executing on the compute cluster;

train the code analyzer based on the logged data queries; and automatically update, using the trained code analyzer, the list of prohibited query operations for the workspace.

8. A method comprising:

creating a workspace on a compute cluster for a user, the user having permissions to the workspace; and provisioning the compute cluster within a cloud computing infrastructure, the compute cluster including a code analyzer, the code analyzer being configured to:

receive a data query from a task executing on the compute cluster;

identify a query operation included in the data query;

compare the query operation to a list of prohibited query operations for the workspace to which the user has the permissions; and terminate the data query without execution when the query operation is in the list of prohibited query operations for the workspace to which the user has the permissions.

9. The method of claim 8, wherein the list of prohibited query operations for the workspace is implemented as a just-in-time (JIT) access control feature that enforces the list of prohibited query operations for the user during a predetermined time period and excludes all query operations for the user outside of that predetermined time period by default.

10. The method of claim 8, wherein the query operation is for a first database in the workspace, the code analyzer being further configured to:

identify another query operation included in another data query from the task; and allow the other data query operation when the other data query operation is for a second database outside the workspace.

11. The method of claim 10, wherein the code analyzer is further configured to:

identify another query operation included in another data query from the task; and allow the other data query operation through a just-in-time access feature that enforces the list of prohibited query operations for an external user during a predetermined time period and excludes all query operations for the external user outside of that predetermined time period by default, wherein the external user is from an entity external to the workspace.

12. The method of claim 8, further comprising:

receiving a list of users to be provided the permissions to the workspace; and granting access to the workspace to the list of users though a just-in-time access feature that controls access to the workspace for a predetermined time period and automatically expires that granted access after the predetermined time period has elapsed.

13. The method of claim 8, further comprising: receiving, via a user interface, a request for creating the workspace on the compute cluster for the user.

14. The method of claim 8, further comprising:

logging data queries from the task executing on the compute cluster;

training the code analyzer based on the logged data queries; and automatically updating, using the trained code analyzer, the list of prohibited query operations for the workspace.

15. A non-transitory computer-readable medium storing instructions that are operative upon execution by a processor to:

create a workspace including a compute cluster for a user, the user having permissions to the workspace; and provision the compute cluster within a cloud computing infrastructure, the compute cluster including a code analyzer, the code analyzer being configured to:

receive a data query from a task executing on the compute cluster;

identify a query operation included in the data query;

compare the query operation to a list of allowed query operations for the workspace to which the user has the permissions; and terminate the data query without execution when the query operation is not in the list of allowed query operations for the workspace to which the user has the permissions.

16. The computer-readable medium of claim 1, wherein the list of prohibited query operations for the workspace is implemented as a just-in-time (JIT) access control feature that enforces the list of prohibited query operations for the user during a predetermined time period and excludes all query operations for the user outside of that predetermined time period by default.

17. The computer-readable medium of claim 1, wherein the query operation is for a first database in the workspace, the code analyzer being further configured to:

identify another query operation included in another data query from the task; and allow the other data query operation when the other data query operation is for a second database outside the workspace.

18. The computer-readable medium of claim 1, wherein the code analyzer is further configured to:

identify another query operation included in another data query from the task; and allow the other data query operation through a just-in-time access feature that enforces the list of prohibited query operations for an external user during a predetermined time period and excludes all query operations for the external user outside of that predetermined time period by default, wherein the external user is from an entity external to the workspace.

19. The computer-readable medium of claim 15, wherein the instructions are further operative upon execution by the processor to:

receive a list of users to be provided the permissions to the workspace; and grant access to the workspace to the list of users though a just-in-time access feature that controls access to the workspace for a predetermined time period and automatically expires that granted access after the predetermined time period has elapsed.

20. The computer-readable medium of claim 1, wherein the instructions are further operative upon execution by the processor to:

log data queries from the task executing on the compute cluster;

train the code analyzer based on the logged data queries; and automatically update, using the trained code analyzer, the list of allowed query operations for the workspace.

* * * * *